United States Patent [19]

Williams

[11] 3,750,423
[45] Aug. 7, 1973

[54] BOREHOLE SHOCK ABSORBER
[75] Inventor: Robert Carl Williams, Spring, Tex.
[73] Assignee: Dresser Industries, Inc., Dallas, Tex.
[22] Filed: June 28, 1972
[21] Appl. No.: 266,879

[52] U.S. Cl. ............... 64/23, 64/27 L, 64/15 B, 267/137, 267/141, 175/321
[51] Int. Cl. ............................................. F16d 8/00
[58] Field of Search ............... 64/23, 27 L, 15 B, 64/15 R; 267/137, 141; 175/322, 321, 297

[56] References Cited
UNITED STATES PATENTS

| | | | |
|---|---|---|---|
| 2,712,920 | 7/1955 | Cullen et al. | 175/321 |
| 3,235,017 | 2/1966 | Lynes | 175/321 |
| 3,301,009 | 1/1967 | Coulter, Jr. | 64/23 |
| 3,709,478 | 1/1973 | Kisling | 267/137 |

Primary Examiner—Charles J. Myhre
Assistant Examiner—Randall Heald
Attorney—Robert W. Mayer et al.

[57] ABSTRACT

Disclosed herein is an improved borehole shock absorber for use between down hole well tools such as between a hydraulic pump and packer to absorb the shock loading created by the pump and, thereby, avoid damage to the packer. The shock absorber includes at least two relatively moveable members, one of which is connected to the packer and one to the pump with a shock absorbing material located therebetween arranged to absorb the shock created by the pump. One of the members is to be provided with a plurality of circumferentially spaced, elongated slots. The slots are located in the member adjacent the rubber so that when the shock absorbing material has been loaded, deformation in the slotted member can occur to permit additional deformation of the rubber and absorb shocks of a magnitude beyond the normal loading.

9 Claims, 4 Drawing Figures

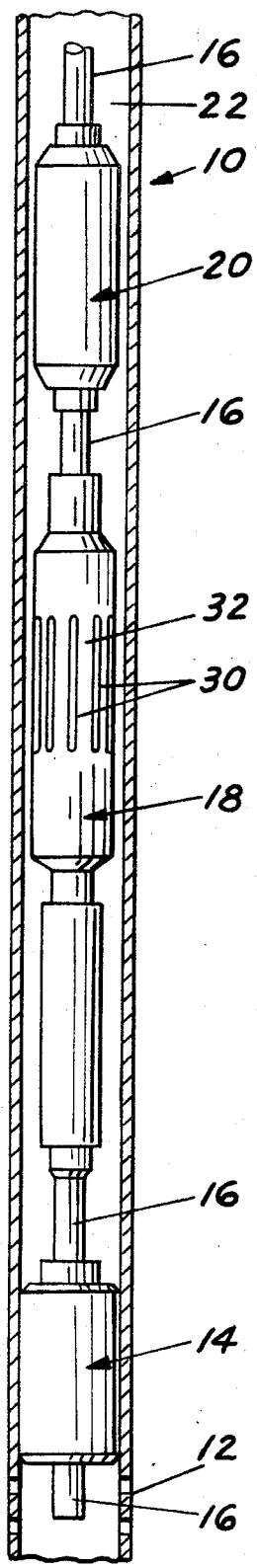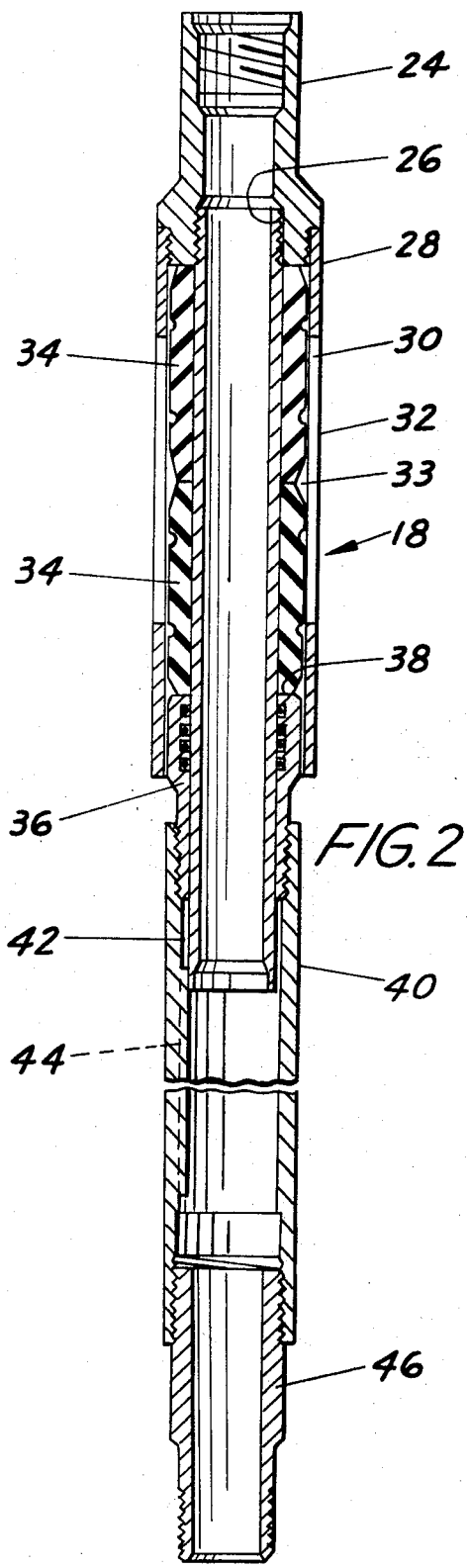
FIG.1
FIG.2

FIG. 3
FIG. 4
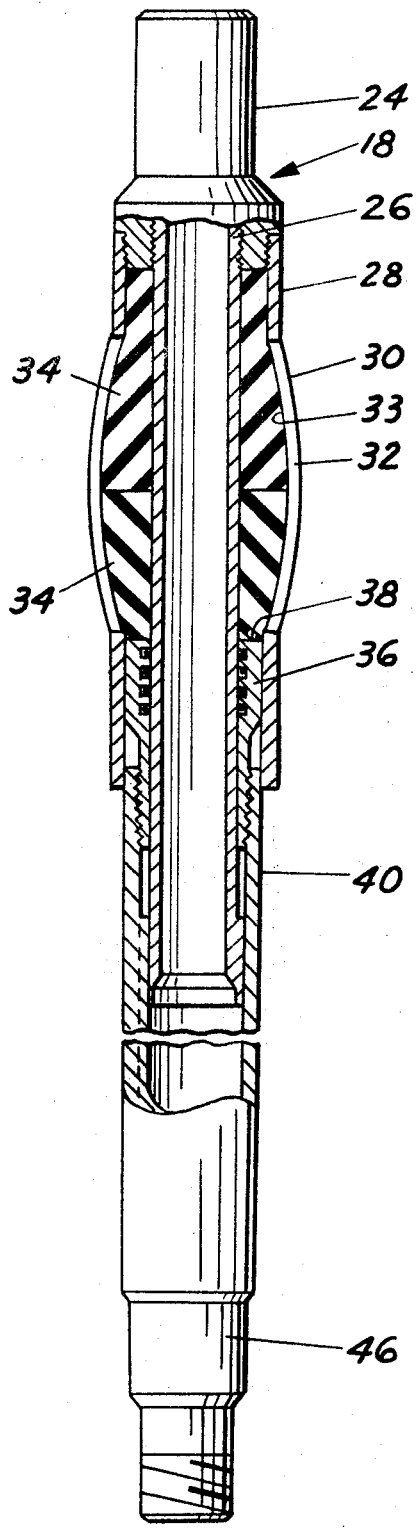
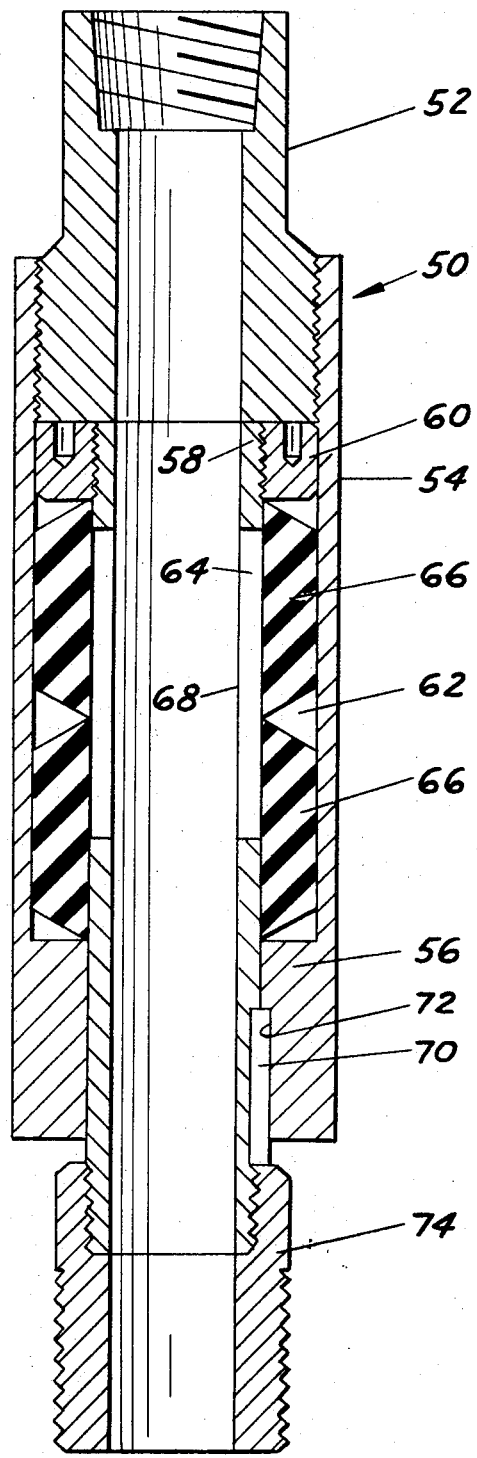

BOREHOLE SHOCK ABSORBER

BACKGROUND OF THE INVENTION

This invention relates generally to improved shock absorbers for use in well bores. More particularly, but not by way of limitation, this invention relates to an improved shock absorber for use in well bores between a first tool creating a shock loading and a connected tool that is relatively fixed in the well bore.

Many different types of shock absorbers for use in well bores have been constructed in the past. Some of these have included rubber as the cushioning element, some have included metallic springs, some have utilized combinations of metal and rubber, and some have incorporated relatively complex hydraulic systems. Examples of several of the foregoing types may be found in U. S. Pat. No. 2,756,022 issued to H. D. Sturgeon on July 24, 1956; U. S. Pat. No. 3,263,446 issued to J. H. Wiggins, Jr. on Aug. 2, 1966; and U. S. Pat. No. 3,406,537 issued to C. B. Falkner, Jr. on Oct. 22, 1968. While each of the foregoing discloses a shock absorber, they are each intended for a different use than that proposed for the shock absorber of this invention and, accordingly, different criteria was utilized in their design. While each of the foregoing examples may function in a satisfactory manner for the intended purpose, it is not believed that they will function satisfactorily in the service application required of the present invention.

SUMMARY OF THE INVENTION

It is one object of this invention to provide an improved shock absorber that effectively alleviates damage to a tool fixed in the well bore as a result of shock loading imposed by another tool located therein and connected thereto.

Another object of this invention is to provide an improved shock absorber through which tensile loads can be transmitted and yet, one that is capable of absorbing additional impulse or shock loading.

A further object of the invention is to provide an improved shock absorber through which compressive loads can be transmitted and yet, one that is capable of absorbing additional shock or impulse loading.

A further object of the invention is to provide an improved shock absorber for use in well bores capable of absorbing considerable shock loading while permitting torsional forces to be transmitted therethrough.

A further object of the invention is to provide an improved shock absorber for use in well bores that is simply constructed, easy to manufacture, and requires little or no maintenance during its service life.

This invention provides an improved borhole shock absorber for use between a first tool creating a shock loading and a second tool that is relatively fixed in a well bore of the like. The shock absorber comprises a variable volume annular space formed by first and second elongated members that are concentrically arranged and moveable relative to each other to change the volume in the annular space. Each of the members is arranged for connection with one of the first and second tools. One of the members is provided with a plurality of circumferentially spaced elongated slots therein. Annular rubber means is disposed in and partially fills the annular space adjacent the slots in engagement with both of the members whereby a decrease of volume in the annular space deforms the rubber to fill the annular space and a further decrease in volume deforms the rubber and the slotted member to absorb the shock loading.

The foregoing and additional objects and advantages of the invention will become more apparent as the following detailed description is read in conjunction with the accompanying drawing.

BRIEF DESCRIPTION OF THE DRAWING

FIG. 1 is an elevation view, somewhat schematic, of the shock absorber of this invention disposed in a well bore between a pump and a well packer.

FIG. 2 is an enlarged, cross-sectional view of the shock absorber constructed in accordance with one embodiment of the invention.

FIG. 3 is a cross-sectional view similar to FIG. 2, but illustrating the components of the shock absorber in the positions they occupy during loading.

FIG. 4 is an enlarged cross-sectional view of another embodiment of shock absorber also constructed in accordance with the invention.

DETAILED DESCRIPTION OF THE PREFERRED EMBODIMENT

Referring to the drawing and to FIG. 1 in particular, shown therein and generally designated by the reference character 10, is a casing located in a well bore. The casing 10 has, near its lower end, a plurality of perforations 12 that permit communication from the exterior to the interior thereof.

Located just above the perforations 12 is a packer 14 that functions to seal against the inner wall of the casing 10 preventing flow between tubing 16 and the casing 10. The packer 14 may be of any suitable type and is generally anchored in the casing 10 by casing engaging devices known in the art as slips (not shown). The slips prevent movement of the packer 14 longitudinally through the casing 10 after the seal has been established.

Connected with the tubing 16 is a shock absorber 18 that is constructed in accordance with the invention and that will be described more fully hereinafter. The upper end of the shock absorber 18 is connected directly or by sections of the tubing 16 with a hydraulic pump 20.

As can be seen, the lower end of the tubing 16 extends downwardly from the bottom of the packer 14 near the perforations 12. The perforations 12 will be located adjacent a producing formation and oil flowing therethrough will be pumped upwardly through the tubing 16 by the hydraulic pump 20. The oil pumped by the hydraulic pump 20 is delivered through the upper portion of the tubing 16 to the surface near the mouth of the well bore (not shown).

The hydraulic pump 20 is shown only schematically and may be of any hydraulically-powered, reciprocating type. The hydraulic pump 20 is powered by high pressure fluid pumped from the surface through the annulus 22 between the tubing 16 and the casing 10. When this type of pump is utilized in high volume, high speed service, rather severe shock loading occurs as the piston reciprocates.

As shown more clearly in FIG. 2, the shock absorber 18 includes an upper end or adapter 24 that is arranged for connection with the tubing 16. An inner tubular member or mandrel 26 is threadingly connected with the adapter 24 and extends downwardly therefrom. An outer tubular member or housing 28 is also threadingly connected with the adapter 24 and extends downwardly therefrom in concentric, but spaced relationship to the mandrel 26. The housing 28 is provided with a plurality of slits 30 (see also FIG. 1) so that the center portion of the housing 28 is made up of a plurality of slats 32 that are relatively flexible.

Disposed within an annular space 33 formed between the mandrel 26 and housing 28 are annular rubber members 34 that are configured so that they partially fill the annular space 33. Slidingly encircling the mandrel 26 is a deforming member 36 of tubular configuration that is partially disposed within the housing 28 and has its upper end 38 engaging the lower end of the rubber members 34.

The annular rubber members 34 are preferably constructed from a synthetic or natural rubber or rubber-like material that is impervious to the fluid disposed in the casing 10. The material should be resilient, of a hardness sufficient to support the anticipated loads, and yet sufficiently soft to permit deformation and absorption of the shock loading as will be described.

In order to transmit torque through the shock absorber 18, a torsion fitting 40 is threadingly connected to the lower end of the deforming member 36. The torsion fitting 40 slidingly encircles the lower end of the mandrel 26 and is illustrated as being keyed thereto by splines 42 formed on the exterior of the lower end of the mandrel 26. The torsion fitting 40 is suitably slotted at 44 to accomodate the splines 42. It will be noted that the slots 44 are of sufficient length to permit longitudinal movement of the torsion fitting 40 and the connected deforming member 36 relative to the mandrel 26. A lower adapter 46 is threadingly connected with the torsion fitting 40 to provide suitable threads for innerconnection with a section of the tubing 16.

With the shock absorber 18 innerconnected with the pump 20 and the packer 14, the tubing 16 is lowered into the casing 10 until the packer 14 is located above the perforations 12. Upon reaching this position, the tubing 16 is manipulated in whatever manner is necessary to set the packer 14 therein. Frequently, it is necessary to rotate the tubing 16 and portions of the packer 14 in order to attain the setting of the packer 14. Since the torque is applied at the surface, the splines 42 and slots 44 in the torsion fitting 40 have been provided to transmit the torque through the shock absorber 18.

Assuming that the packer 14 is of the compression-set type, a portion of the weight of the tubing 16 is applied to the packer 14 so that the weight of the tubing 16 is utilized to form the packing seal and set the slips during the packer setting operation. After the packer 14 has been set, most or all of the weight of the tubing 16 is removed therefrom. However, the tubing 16 will be clamped at the upper end of the well bore and due to temperature, tensile loads, etc. that are present in the well bore, the tubing 16 may elongate imposing compressive loads on the shock absorber 18.

When this occurs, the upper adapter 24, mandrel 26 and housing 28 move downwardly relative to the deforming member 36 so that the rubber members 34 are deformed to fill or partially fill the annular space 33 formed in the shock absorber 18. Should the volume of the space 33 be decreased a sufficient amount, the rubber members 34 will fill the annular space 33 and due to the characteristics of rubber-like materials, a solid, virtually unyielding condition exists.

If at this time the pump 20 is placed in operation, the reciprocation imposes shock loading on the shock absorber 18 that could result in damage to the packer 14. However, the slits 30 provided in the housing 28 permit the slats 32 to yield outwardly whereby additional deformation permit the rubber members 34 can occur to absorb the shock loading from the pump 20 as shown in FIG. 3.

Normally, the shock absorber 18 will have an outside diameter not too much smaller than the inside diameter of the casing 10 which will prevent the slats 32 from deforming past their yield point and taking a permanent set. The slits 30 provide a fluid by-pass if the slats 32 engage the casing 10 to avoid the imposition of an undesirable differential in pressure across the packer 14.

In the event that the initial compressive load does not fully deform the rubber members 34, and some space remains in the annular space 33 formed by the housing 28 and mandrel 26, the rubber members 34 will absorb the shock loading without deformation of the slats 32.

From the foregoing, it can be appreciated that the shock absorber illustrated in FIGS. 2 and 3 is capable of transmitting compressive loads and torsional loads to aid in setting the packer or to perform other manipulations in the well, and have sufficient additional shock absorbing characteristics to absorb shock loads imposed by the pump 20 to prevent damage to the packer 14.

DESCRIPTION OF THE EMBODIMENT OF FIG. 4

FIG. 4 illustrates another embodiment of shock absorber that is generally designated by the reference character 50. The shock absorber 50 may be used in an installation similar to that illustrated in FIG. 1, and is generally used when the packer 14 is of the type that is set by placing tensile loads thereon.

The shock absorber 50 includes an upper adapter 52 arranged to be connected with the tubing 16. Threadingly connected with the upper adapter 52 is a housing 54 which has an inwardly projecting flange 56 on the lower end thereof.

An inner tubular member or mandrel 58 is slidingly disposed within the housing 54, and is provided at its upper end with an outwardly projecting flange 60. It will be noted that the inner periphery of the flange 56 and the outer periphery of the flange 60 are disposed in close proximity to the mandrel 58 and to the housing 54, respectively, thus forming a chamber or annular space 62 therebetween.

In FIG. 4, the mandrel 58 is illustrated as having slits 64 extending therealong adjacent annular rubber members 66 that are disposed within the chamber or annular space 62. The slits 64 provide slats 68 in the mandrel 58 somewhat as did the slits 30 provide slats 32 on the housing 28 of the shock absorber 18.

It should be pointed out that the housing 54 of the shock absorber 50 could be provided with the slits in lieu of the mandrel 58, or both could be provided with slits if desired or needed. Similarly, the mandrel 26 of the shock absorber 18 could be provided with slits 30 instead of the housing 28 as shown in FIG. 2.

It will be noted in FIG. 4 that a key 70 is located in the lower end of the mandrel 58. The key 70 is disposed in a slot 72 formed in the flange 56 to permit torsional loads to be transmitted through the shock absorber 50 while at the same time permitting longitudinal movement between the mandrel 58 and the houisng 54.

The lower end of the shock absorber 50 is provided with an adapter 74 that is threadingly connected with the lower end of the mandrel 58. The adapter 74 permits connection of the shock absorber 50 with a section of the tubing 16.

With the shock absorber 50 connected in the tubing 16 between the pump 20 and packer 14, tensile forces can be applied through the shock absorber 50. As the pump 20 and tubing 16 are pulled upwardly, the housing 54 moves upwardly bringing the flange 56 into engagement with the lower end of the rubber members 66. Simultaneously, the weight suspended below the shock absorber 50 pulls downwardly on the adapter 74 and mandrel 58 bringing the flange 60 into engagement with the upper end of the rubber members 66 so that the rubber members 66 are deformed between the flanges 56 and 60.

If the relative movement between the mandrel 58 and housing 54 is sufficient, the annular space 62 is filled with the rubber members 66. Additional tensile loading imposed thereon such as by operation of the pump 20, may cause deformation of the slats 68 providing additional space for deformation of the rubber members 66 so that they will absorb the shock or impulse loads. In the event that the initial tensile loads applied to the shock absorber 50 are not of sufficient magnitude to completely deform the rubber members 66, then the shock loads imposed by the pump 20 are absorbed by deformation of the rubber members 66.

From the foregoing, it can be appreciated that the shock absorber 50 can be utilized in those instances where it is desired to place tensile loads on the packer 14 or other tools located in the well thereinbelow, and to transmit the torsional forces necessary to set the packer 14 while at the same time providing a means for absorbing the shock loading imposed by the pump 20 to prevent damage to the packer 14.

The shock absorbers 18 and 50, as described in detail hereinbefore, can thus be utilized to absorb shock or impulse loads generated by a well tool, such as the pump 20, to prevent damage to another relatively fixed well tool, such as the packer 14. Depending upon the type of loading necessary to set the packer 14, either the shock absorber 18 or the shock absorber 50 may be utilized and either is capable of transmitting the torsional forces necessary to accomplish the setting of the packer 14.

The foregoing detailed description of the embodiments has been presented by way of example only, and it will be understood that many changes and modifications can be made thereto without departing from the spirit and scope of the invention.

The embodiments of the invention in which an exclusive property or privilege is claimed as defined as follows:

1. An improved borehole shock absorber for use between a first tool creating a shock loading and a second tool that is relatively fixed in a well bore or the like, said shock absorber comprising:
   means forming a variable volume annular space, said means including first and second elongated members concentrically arranged and moveable relative to each other to change the volume of said annular space, each said member being arranged for connection with one of the first and second tools, and one of said members including a plurality of circumferentially spaced slots extending through and longitudinally thereof increasing the flexibility of said one member; and,
   annular rubber means disposed in and partially filling said annular space adjacent said slots, said rubber means engaging both said members, whereby a decrease in volume in said annular space as a result of said shock loading deforms said rubber means to fill said annular space and a further decrease in volume deforms said rubber means and said one member between said slots.

2. The improved borehole shock absorber of claim 1 wherein:
   said means forming said variable volume annular space also includes a third elongated member disposed within said pair of elongated members;
   said first elongated member being connected to said third elongated member at one end and arranged for connection with the first tool; and,
   said second elongated member being slidingly disposed between said first and third elongated members and arranged at one end for connection with the second tool.

3. The improved borehole shock absorber of claim 2 wherein said slots are formed in said first elongated member.

4. The improved borehole shock absorber of claim 2 wherein said slots are formed in said third elongated member.

5. The improved borehole shock absorber of claim 2 and also including means disposed between and engaging said second and third elongated member for preventing relative rotation therebetween while permitting relative longitudinal movement.

6. The improved borehole shock absorber of claim 1 wherein:
   said first elongated member is arranged for connection with the first tool and includes an inwardly extending flange disposed adjacent said second elongated member;
   said second elongated member is slidingly disposed with respect to said first elongated member and includes an outwardly extending flange disposed adjacent said first elongated member and arranged for connection with the second tool; and,
   said rubber means being located between said flanges and engageable therewith upon relative movement between said elongated members.

7. The improved borehole shock absorber of claim 6 wherein said slots are formed in said first elongated member.

8. The improved borehole shock absorber of claim 6 wherein said slots are formed in said second elongated member.

9. The improved borehole shock absorber of claim 6 and also including means disposed between and engaging said first and second elongated members for preventing relative rotation therebetween while permitting relative longitudinal movement.

* * * * *